(12) United States Patent
Kopp

(10) Patent No.: US 10,502,898 B2
(45) Date of Patent: Dec. 10, 2019

(54) CHIRAL FIBER CIRCULAR POLARIZER

(75) Inventor: Victor Il'ich Kopp, Fair Lawn, NJ (US)

(73) Assignee: CHIRAL PHOTONICS, INC., Pine Brook, NJ (US)

( * ) Notice: Subject to any disclaimer, the term of this patent is extended or adjusted under 35 U.S.C. 154(b) by 423 days.

(21) Appl. No.: 13/354,666

(22) Filed: Jan. 20, 2012

(65) Prior Publication Data

US 2012/0189241 A1 Jul. 26, 2012

Related U.S. Application Data

(60) Provisional application No. 61/421,971, filed on Jan. 20, 2011.

(51) Int. Cl.
*G02B 6/00* (2006.01)
*G02B 6/27* (2006.01)
*G02B 6/024* (2006.01)
*G02B 6/10* (2006.01)

(52) U.S. Cl.
CPC ............ *G02B 6/274* (2013.01); *G02B 6/276* (2013.01); *G02B 6/024* (2013.01); *G02B 6/105* (2013.01)

(58) Field of Classification Search
CPC ...... G02B 6/126; G02B 6/105; G02B 6/2766; G02B 6/2726; G02B 6/2773; G02B 6/00
USPC .................... 385/11, 15, 24, 27, 28
See application file for complete search history.

(56) References Cited

U.S. PATENT DOCUMENTS

| | | |
|---|---|---|
| 6,396,859 B1 | 5/2002 | Kopp et al. |
| 6,404,789 B1 | 6/2002 | Kopp et al. |
| 6,411,635 B1 | 6/2002 | Kopp et al. |
| 6,671,293 B2 | 12/2003 | Kopp et al. |
| 6,678,297 B2 | 1/2004 | Kopp et al. |
| 6,721,469 B2 | 4/2004 | Kopp et al. |
| 6,741,631 B2 | 5/2004 | Kopp et al. |
| 6,744,943 B2 | 6/2004 | Kopp et al. |
| 6,792,169 B2 | 9/2004 | Kopp et al. |
| 6,839,486 B2 | 1/2005 | Kopp et al. |
| 6,875,276 B2 | 4/2005 | Shibayev et al. |
| 6,891,622 B2 * | 5/2005 | Dyott ............................ 356/483 |

(Continued)

FOREIGN PATENT DOCUMENTS

WO WO 2002/073247 A2 9/2002
WO WO 2006/046947 A2 5/2006

(Continued)

OTHER PUBLICATIONS

T. J. Seok, V. Kopp, D. Neugroschl, J. Henriksson, J. Luo, and M. C. Wu, "High density optical packaging of high radix silicon photonic switches," 2017 Optical Fiber Communications Conference and Exhibition (OFC), Los Angeles, CA, Optical Society of America, pp. 1-3 (2017).

(Continued)

*Primary Examiner* — Jennifer Doan

(74) *Attorney, Agent, or Firm* — Knobbe, Martens, Olson & Bear, LLP

(57) ABSTRACT

The inventive circular chiral fiber polarizer is operable to convert linearly polarized light to circularly polarized light, may be advantageously fabricated in an "in-fiber" manner and to comprise desirable extinction ratio characteristics, and may also serve as an interface between a sequentially positioned polarization maintaining (PM) fiber, and a single mode (SM) fiber.

16 Claims, 1 Drawing Sheet

(56) References Cited

U.S. PATENT DOCUMENTS

| | | | |
|---|---|---|---|
| 6,891,992 | B2 | 5/2005 | Kopp et al. |
| 6,925,230 | B2 | 8/2005 | Kopp et al. |
| 7,009,679 | B2 | 3/2006 | Kopp et al. |
| 7,095,911 | B2 * | 8/2006 | Kopp et al. ............... 385/11 |
| 7,142,280 | B2 | 11/2006 | Kopp et al. |
| 7,242,702 | B2 | 7/2007 | Kopp et al. |
| 7,308,173 | B2 | 12/2007 | Kopp et al. |
| 7,463,800 | B2 | 12/2008 | Kopp et al. |
| 7,983,515 | B2 | 7/2011 | Zhang et al. |
| 8,218,921 | B2 | 7/2012 | Kopp et al. |
| 8,326,099 | B2 | 12/2012 | Singer et al. |
| 8,457,456 | B2 | 6/2013 | Kopp et al. |
| 8,463,094 | B2 | 6/2013 | Kopp et al. |
| 8,712,199 | B2 | 4/2014 | Kopp et al. |
| 8,948,547 | B2 | 2/2015 | Kopp |
| 9,766,407 | B2 | 9/2017 | Weiner et al. |
| 9,810,845 | B2 | 11/2017 | Kopp |
| 9,817,191 | B2 | 11/2017 | Kopp et al. |
| 9,851,510 | B2 | 12/2017 | Kopp |
| 9,857,536 | B2 | 1/2018 | Kopp et al. |
| 9,885,825 | B2 | 2/2018 | Kopp |
| 9,921,355 | B2 | 3/2018 | Weiner et al. |
| 9,983,362 | B2 | 5/2018 | Kopp et al. |
| 10,078,019 | B2 | 9/2018 | Kopp et al. |
| 10,101,536 | B2 | 10/2018 | Kopp et al. |
| 10,126,494 | B2 | 11/2018 | Kopp |
| 2002/0003827 | A1 | 1/2002 | Genack et al. |
| 2002/0069676 | A1 | 6/2002 | Kopp et al. |
| 2002/0118710 | A1 | 8/2002 | Kopp et al. |
| 2002/0172461 | A1 | 11/2002 | Singer et al. |
| 2003/0118285 | A1 | 6/2003 | Kopp et al. |
| 2004/0145704 | A1 | 7/2004 | Kopp et al. |
| 2008/0098772 | A1 | 5/2008 | Kopp et al. |
| 2009/0324159 | A1 | 12/2009 | Kopp et al. |
| 2010/0002983 | A1 | 1/2010 | Kopp et al. |
| 2010/0158438 | A1 | 6/2010 | Churikov et al. |
| 2011/0292676 | A1 | 12/2011 | Weiner et al. |
| 2011/0293219 | A1 | 12/2011 | Weiner et al. |
| 2012/0189241 | A1 | 7/2012 | Kopp et al. |
| 2012/0257857 | A1 | 10/2012 | Kopp et al. |
| 2013/0121641 | A1 | 5/2013 | Singer et al. |
| 2013/0188174 | A1 | 7/2013 | Kopp et al. |
| 2013/0188175 | A1 | 7/2013 | Kopp et al. |
| 2013/0216184 | A1 | 8/2013 | Kopp et al. |
| 2015/0212274 | A1 | 7/2015 | Kopp |
| 2017/0219774 | A1 | 8/2017 | Kopp |
| 2017/0268937 | A1 | 9/2017 | Kopp et al. |
| 2017/0269277 | A1 | 9/2017 | Weiner et al. |
| 2017/0269293 | A1 | 9/2017 | Churikov et al. |
| 2017/0336659 | A1 | 11/2017 | Kopp et al. |

FOREIGN PATENT DOCUMENTS

| | | |
|---|---|---|
| WO | WO 2008/080174 A1 | 7/2008 |
| WO | WO 2017/053479 A1 | 3/2017 |
| WO | WO 2017/100667 A1 | 6/2017 |
| WO | WO 2018/085435 A1 | 5/2018 |

OTHER PUBLICATIONS

P. De Heyn, V.I. Kopp, S. A. Srinivasan, P. Verheyen, J. Park, M.S. Wlodawski, J. Singer, D. Neugroschl, B. Snyder, S. Balakrishnan, G. Lepage, M. Pantouvaki, P. Absill , and J. Van Campenhout, "Ultra-dense 16x56Gb/s NRZ GeSi EAM-PD arrays coupled to multicore fiber for short-reach 896Gb/s optical links," 2017 Optical Fiber Communications Conference and Exhibition (OFC), Los Angeles, CA, Optical Society of America, pp. 1-3 (2017).

V.I. Kopp, J. Park, M.S. Wlodawski, J. Singer, D. Neugroschl, P. de Heyn, B. Snyder, J. Van Campenhout, and P. Absil, "Flexible, Multi-channel, Ultra-dense Optical Interface for Silicon Photonics," Ecoc 2016; 42nd European Conference on Optical Communications, Dusseldorf, Germany, 755-757 (2016).

P. Liao, M. Sakib, F. Lou, J. Park, M. Wlodawski, V.I. Kopp, D. Neugroschl, and O. Liboiron-Ladouceur, "Ultradense Silicon Photonic Interface for Optical Interconnection," in IEEE Photonics Technology Letters, vol. 27, No. 7, pp. 725-728 (2015).

V.I. Kopp, J. Park, M. Wlodawski, E. Hubner, J. Singer, D. Neugroschl, A. Z. Genack, P. Dumon, J. Van Campenhout, and P. Absil, "Two-Dimensional, 37-Channel, High-Bandwidth, Ultra-Dense Silicon Photonics Optical Interface," Journal of Lightwave Technology, vol. 33, No. 3, pp. 653-656 (2015).

V. I. Kopp, J. Park, M. S. Wlodawski, E. Hubner, J. Singer, D. Neugroschl, and A. Z. Genack, "Vanishing Core Optical Waveguides for Coupling, Amplification, Sensing, and Polarization Control," In Advanced Photonics, OSA Technical Digest (online), paper SoW1B.3, Optical Society of America, pp. 1-3 (2014).

M. Wlodawski, V.I. Kopp, J. Park, J. Singer, E. Hubner, D. Neugroschl, N. Chao, and A.Z. Genack, "A new generation of ultra-dense optical I/O for silicon photonics," Proceedings of SPIE—The International Society for Optical Engineering. vol. 8990, 899006, pp. 1-12 (2014).

V.I. Kopp, J. Park, M. Wlodawski, J. Singer, and D. Neugroschl, "Polarization maintaining, high-power and high-efficiency (6+1)x1 pump/signal combiner", Proc. SPIE 8961, Fiber Lasers XI: Technology, Systems, and Applications, 89612N, pp. 1-6 (2014).

V. I. Kopp, J. Park, M. Wlodawski, J. Singer, D. Neugroschl and A. Z. Genack, "Chiral Fibers: Microformed Optical Waveguides for Polarization Control, Sensing, Coupling, Amplification, and Switching," In Journal of Lightwave Technology, vol. 32, no. 4, pp. 605-613 (2014).

D. Neugroschl, J. Park, M. Wlodawski, J. Singer, and V.I. Kopp, "High-efficiency (6+1)x1 combiner for high power fiber lasers and amplifiers", Proc. SPIE 8601, Fiber Lasers X: Technology, Systems, and Applications, 860139, pp. 1-6 (2013).

V. I. Kopp, J. Park, M. Wlodawski, J. Singer, D. Neugroschl and A. Z. Genack, "Pitch Reducing Optical Fiber Array and multicore fiber for space-division multiplexing," 2013 IEEE Photonics Society Summer Topical Meeting Series, Waikoloa, HI, pp. 99-100 (2013).

V. I. Kopp, J. Park, M. Wlodawski, J. Singer, D. Neugroschl and A. Z. Genack, "Pitch Reducing Optical Fiber Array for dense optical interconnect," IEEE Avionics, Fiber-Optics and Photonics Digest CD, Cocoa Beach, FL, 2012, pp. 48-49.

J. Park, M.S. Wlodawski, J. Singer, D. Neugroschl, A.Z. Genack, V.I. Kopp, "Temperature and Pressure Sensors Based on Chiral Fibers", Proc. of SPIE 8370, 837008, pp. 1-8 (2012).

F.E. Doany, B.G. Lee, S.Assefa, W.M.J. Green, M. Yang, C.L. Schow, C.V. Jahnes, S. Zhang, J. Singer, V.I. Kopp, J.A. Kash, and Y.A. Vlasov, "Multichannel High-Bandwidth Coupling of Ultra-Dense Silicon Photonic Waveguide Array to Standard-Pitch Fiber Array", IEEE J. of Lightwave Technology, 29, 4, 475-482 (2011).

V.I. Kopp, J. Singer, D. Neugroschl, and A.Z. Genack, "Chiral fiber sensors for harsh environments", Proc. SPIE 8028, Fiber Optic Sensors and Applications VIII, 802803, pp. 1-8 (2011).

V.I. Kopp and A.Z. Genack, "Chiral Fibres: Adding Twist", Nature Photonics 5, 470-472 (2011).

V.I. Kopp, V.M. Churikov, J. Singer, D. Neugroschl, and A.Z. Genack, "Chiral fiber sensors," Proc. SPIE 7677, Fiber Optic Sensors and Applications VII, 76770U, pp. 1-6 (2010).

V.M. Churikov, V.I. Kopp, and A.Z. Genack, "Chiral diffraction gratings in twisted microstructured fibers", Opt. Lett. 35(3), 342-344 (2010).

S. Guillemet, D. Kinet, A. Bertrand, Y. Hernandez, and D. Giannone, "High Power All-In-Fibre Linearly Polarized Laser Using Chiral Grating-Based Polarizer", 4th EPS-QEOD Europhoton Conference, 1 page (2010).

C. R. Doerr, L. Zhang, P. J. Winzer, "Monolithic InP Multi-Wavelength Coherent Receiver", Proc. OFC, paper PDPB1, Optical Society of America, pp. 1-3, (2010).

S. Guillemet, D. Kinet, A. Bertrand, Y. Hernandez, and D. Giannone, "Experimental study and comparison of three innovative high power CW polarised all-in-fibre laser designs", IEEE Photonics Benelux Chapter, 141-144 (2010).

H. Henschel, S.K. Hoeffgen, J. Kuhnhenn and U. Weinand, "High Radiation Sensitivity of Chiral Long Period Gratings", IEEE Transaction on Nuclear Science, 57, 5, 2915-2922 (2010).

(56) References Cited

OTHER PUBLICATIONS

V.M. Churikov, V.I. Kopp, A.Z. Genack, "Dual-twist fiber long period gratings", Proceedings of SPIE 7212, 72120H, pp. 1-9 (2009).

V.I. Kopp, G. Zhang, S. Zhang, A.Z. Genack, and D. Neugroschl, "Chiral fiber optical isolator", Proceedings of SPIE 7195, 71950B, pp. 1-8 (2009).

S. Zhang, V.I. Kopp, V. Churikov, and G. Zhang, "Panda-based chiral in-fiber polarizer", Proceedings of SPIE 7212, 72120D, pp. 1-8 (2009).

G. Shvets, S. Trendafilov, V.I. Kopp, D. Neugroschl, and A.Z. Genack, "Polarization properties of chiral fiber gratings", J. Opt. A: Pure Appl. Opt. 11, 074007, pp. 1-10 (2009).

C.R. Doerr, L. Zhang, L. Buhl, V.I. Kopp, D. Neugroschl, and G. Weiner, "Tapered Dual-Core Fiber for Efficient and Robust Coupling to InP Photonic Integrated Circuits", Proc. OFC, Optical Society of America, pp. 1-3 (2009).

D. Neugroschl, V.I. Kopp, J. Singer, and G. Zhang, "Vanishing-core tapered coupler for interconnect applications", Proceedings of SPIE 7221, 72210G, pp. 1-8 (2009).

V. I. Kopp, V. M. Churikov, and A. Z. Genack, "Chiral Fiber Gratings Sense the Environment", Laser Focus World, 76-79 (2008).

V. I. Kopp and A. Z. Genack, "Chiral fibers", Chapter 12 in Specialty Optical Fibers Handbook edited by Alexis Mendez and T. F. Morse. Academic Press, 401-427 (2007).

V. I. Kopp, V. M. Churikov, G. Zhang, J. Singer, C. W. Draper, N. Chao, D. Neugroschl, and A.Z. Genack, "Single- and double-helix chiral fiber sensors", J. Opt. Soc. Am. B 24(10), A48-A52 (2007).

V. I. Kopp, V. M. Churikov, G. Zhang, J. Singer, C. W. Draper, N. Chao, D. Neugroschl, and A.Z. Genack, "Chiral fiber gratings: perspectives and challenges for sensing applications", (Invited Paper), Proceedings of SPIE 6619, 66190B, pp. 1-8 (2007).

V. I. Kopp, V. M. Churikov, and A. Z. Genack, "Synchronization of optical polarization conversion and scattering in chiral fibers", Optics Letters 31(5), 571-573 (2006).

A. Z. Genack, V. I. Kopp, V. M. Churikov, J. Singer, N. Chao, and D. Neugroschl, "From planar to fiber chiral gratings", (Invited Paper), Proceedings of SPIE 5741, 90-97 (2005).

A. Z. Genack, V. I. Kopp, V. M. Churikov, J. Singer, N. Chao, and D. Neugroschl, "Chiral fiber Bragg gratings", Proceedings of SPIE 5508, 57, pp. 1-8 (2004).

V.I. Kopp, V.M. Churikov, J. Singer, N. Chao, D. Neugroschl, and A. Z. Genack, "Chiral fiber gratings", Science 305, 74-75 (2004).

V. I. Kopp, A. Z. Genack, V. M. Churikov, Jonathan Singer and Norman Chao, "Chiral Fiber Gratings Polarize Light", Photonics Spectra 38, 78-79 (2004).

V.I. Kopp, R. Bose, and A.Z. Genack, "Transmission through chiral twist defects in anisotropic periodic structures", Optics Letters 28(5), 349-351 (2003).

P.V. Shibaev, V.I. Kopp, and A.Z. Genack, "Photonic materials based on mixtures of cholesteric liquid crystals with polymers", J. Phys. Chem. B.107, 6961-6964 (2003).

V.I. Kopp, Z.-Q. Zhang and A.Z. Genack, "Lasing in chiral photonic structures", Progress in Quantum Electronics 27, 369-416 (2003).

V.I. Kopp and A.Z. Genack, "Double-helix chiral fibers", Optics Letters 28(20), 1876-1878 (2003).

P.V. Shibaev, K. Tang, A.Z. Genack, V. Kopp, and M. M. Green, "Lasing from a stiff chain polymeric lyotropic cholesteric liquid crystal", Macromolecules 35(8), 3022-3025 (2002).

V.I. Kopp and A.Z. Genack, "Twist defect in chiral photonic structures", Physical Review Letters 89(3), 033901, pp. 1-4 (2002).

V. I. Kopp, P. V. Shibaev, R. Bose, and A. Z. Genack, "Anisotropic photonic-bandgap structures", Proceedings of SPIE 4655, 141-149 (2002).

V.I. Kopp, Z.-Q. Zhang and A.Z. Genack, "Large coherence area thin-film photonic stop-band lasers", Physical Review Letters 86(9), 1753-1756 (2001).

V. I. Kopp and A. Z. Genack, "Density of states and lasing at the edge of a photonic stop band in dye-doped cholesteric liquid crystals", Proceedings of SPIE 3623, 71-79 (1999).

V.I. Kopp and A.Z. Genack, "Lasing at the edge of a photonic stop band in cholesteric liquid crystals", IEEE Leos 13, no. 2, 8-10 (1999).

V.I. Kopp, B.Fan, H.K.M. Vithana, and A.Z. Genack, "Low-threshold lasing at the edge of a photonic stop band in cholesteric liquid crystals", Optics Letters 23(21), 1707-1709 (1998).

B.G. Lee, F.E.Doany, S. Assefa, W.M.J. Green, M. Yang, C.L. Schow, C.V. Jahnes, S. Zhang, J. Singer, V.I. Kopp, J.A. Kash, and Y.A. Vlasov, "20-um-Pitch Eight-Channel Monolithic Fiber Array Coupling 160 Gb/s/Channel to Silicon Nanophotonic Chip", Proc. OFC, PDPA4, Optical Society of America, pp. 1-3, (2010).

* cited by examiner

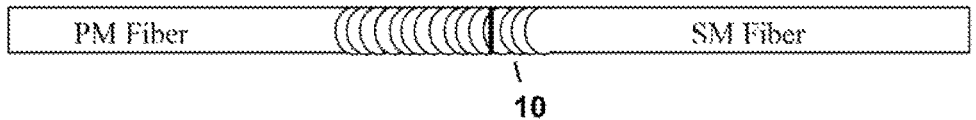

CHIRAL FIBER CIRCULAR POLARIZER

CROSS REFERENCE TO RELATED APPLICATIONS

The present patent application claims priority from the commonly assigned U.S. provisional patent application, Ser. No. 61/138,912, entitled "CHIRAL FIBER CIRCULAR POLARIZER".

FIELD OF THE INVENTION

The present invention relates generally to polarizers, and more particularly to a chiral optical fiber-based polarizer operable to convert linearly polarized light to circularly polarized light.

BACKGROUND OF THE INVENTION

Any device that requires polarized light uses one or more polarizers. Polarizers have many industrial applications. For example, polarizers may be utilized in electro-optical modulators and laser subsystems. In essence, a polarizer eliminates an undesirable light component of a first polarization, and allows a desirable light component of a second polarization to pass through.

Of particular interest is the use of polarizers capable of being readily utilized as in-line modules in optical fibers. In addition, a number of practical polarizer applications would greatly benefit from availability of an inexpensive and easy to produce optical fiber-based polarizer (i.e. that is readily deployable in an "in-line" configuration), that is operable to convert linearly polarized light to circularly polarized light. It would further be desirable to provide a highly configurable optical fiber-based polarizer that may be fabricated to achieve desired extinction ratio parameters (e.g., to maximize the extinction ratio, to minimize the extinction ratio, or to achieve any desired value therebetween). It would additionally be desirable to provide an optical fiber-based polarizer with the above-noted polarization conversion features, that also comprises an interface between a polarization maintaining (PM) fiber, and a single mode (SM) fiber.

BRIEF DESCRIPTION OF THE DRAWING

FIG. 1 is a schematic diagram of a side view of a first exemplary embodiment of the inventive chiral fiber circular polarizer of the present invention.

SUMMARY OF THE INVENTION

The circular chiral fiber polarizer of the present invention is operable to convert linearly polarized light to circularly polarized light, may be advantageously fabricated in an "in-fiber" manner and to comprise desirable extinction ratio characteristics, and may also serve as an interface between a sequentially positioned polarization maintaining (PM) fiber, and a single mode (SM) fiber.

In at least one exemplary embodiment thereof, the inventive optical chiral circular fiber polarizer comprises a linear-polarization maintaining (PM) optical fiber section having a first fiber first PM end and a second PM end, a sequentially positioned single mode (SM) optical fiber section having a first SM end and a second SM end, and
means for connecting the second PM end to the first SM end, such that the sequentially positioned and connected PM and SM optical fiber sections thereby form a continuous polarizer fiber, wherein the resulting continuous polarizer fiber is axially twisted, within a predefined twisting region along its longitudinal axis, in accordance with a predefined twist profile, and the predefined twisting region comprises a first region end disposed between the first PM end and the second PM end, and also comprises a second region end positioned between the first SM end and the second SM end.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE INVENTION

The system and method of the present invention advantageously overcome and address the drawbacks of previously known fiber-based polarizers and provide additional beneficial features. In summary the inventive circular chiral fiber polarizer is operable to convert linearly polarized light to circularly polarized light, may be advantageously fabricated in an "in-fiber" manner, and may also serve as an interface between a sequentially, positioned polarization maintaining (PM) fiber, and a single mode (SM) fiber.

Referring now to FIG. 1, an exemplary embodiment of the inventive chiral fiber circular polarizer is shown as a chiral fiber polarizer 10. The polarizer 10 includes a first linear-polarization maintaining (PM) optical fiber section having a first fiber first PM end and a second PM end, and a sequentially positioned single mode (SM) optical fiber section having a first SM end and a second SM end, where the second PM end is connected to the first SM end (e.g., via a fusion splice therebetween, or by other equivalent or similar technique) a junction point, such that the sequentially positioned and connected PM and SM optical fiber sections, thereby form a continuous fiber structure. The PM optical fiber section may comprise any Pm fiber such as PANDA fiber, while the SM optical fiber section may comprise any SM fiber, such as a conventional SMF fiber.

In accordance with the present invention, the continuous fiber structure is axially twisted, within a predefined twisting region along its longitudinal axis, pursuant to a predefined twist profile. In at least one embodiment of the present invention, the predefined twisting region comprises a first region end disposed between the first PM end and the second PM end of the PM optical fiber section, and also comprises a second region end positioned between the first SM end and the second SM end of the SM optical fiber section. The predetermined twist profile may comprise any desired twist profile, such as a uniform twist, an accelerated twist (for example in accordance with a mathematical function, such as a power function), etc. Furthermore, the twist profile may be readily selected and configured to enable the chiral fiber polarizer 10 to achieve desired extinction ratio parameters (e.g., to maximize the extinction ratio, to minimize the extinction ratio, or to achieve any desired value therebetween).

Thus, while there have been shown and described and pointed out fundamental novel features of the inventive apparatus as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. An optical chiral circular fiber polarizer comprising:
   a linear-polarization maintaining (PM) optical fiber section having a first PM end and a second PM end;
   a sequentially positioned single mode (SM) optical fiber section having a first SM end and a second SM end; and
   connection means for connecting said second PM end to said first SM end, such that said sequentially positioned and connected PM and SM optical fiber sections thereby form a continuous polarizer fiber, wherein said continuous polarizer fiber is axially twisted, within a predefined twisting region along its longitudinal axis, in accordance with a predefined twist profile, and wherein said predefined twisting region comprises a first region end disposed between said first PM end and said second PM end, and also comprises a second region end positioned between said first SM end and said second SM end.

2. The optical chiral circular fiber polarizer of claim 1, wherein said predefined twist profile comprises a uniformly twisted region.

3. The optical chiral circular fiber polarizer of claim 1, wherein said connection means comprises a fusion splice.

4. The optical chiral circular fiber polarizer of claim 1, wherein said predefined twist profile comprises a twist acceleration region, configured in accordance with a power function.

5. The optical chiral circular fiber polarizer of claim 1, wherein said linear-polarization maintaining optical fiber section comprises a PANDA fiber.

6. The optical chiral circular fiber polarizer of claim 1, wherein said SM optical fiber section comprises a conventional SMF fiber.

7. The optical chiral circular fiber polarizer of claim 1, wherein said predefined twist profile is configured to achieve a maximum extinction ratio.

8. The optical chiral circular fiber polarizer of claim 1, wherein said predefined twist profile is configured to achieve a minimum extinction ratio.

9. An optical chiral circular fiber polarizer comprising:
   a linear-polarization maintaining (PM) optical fiber section having a first PM end and a second PM end;
   a single mode (SM) optical fiber section having a first SM end and a second SM end; and
   a connection between said PM optical fiber section and said SM optical fiber section, wherein according to a twist profile, said polarizer is configured to be axially twisted from a first region disposed between said first PM end and said second PM end, through the connection, and to a second region disposed between said first SM end and said second SM end to convert linearly polarized light to circularly polarized light.

10. The optical chiral circular fiber polarizer of claim 9, wherein said twist profile comprises a uniformly twisted region.

11. The optical chiral circular fiber polarizer of claim 9, wherein said connection comprises a fusion splice.

12. The optical chiral circular fiber polarizer of claim 9, wherein said twist profile comprises a twist acceleration region, configured in accordance with a power function.

13. The optical chiral circular fiber polarizer of claim 9, wherein said linear-polarization maintaining optical fiber section comprises a PANDA fiber.

14. The optical chiral circular fiber polarizer of claim 9, wherein said SM optical fiber section comprises an SMF fiber.

15. The optical chiral circular fiber polarizer of claim 9, wherein said twist profile is configured to achieve an increased extinction ratio.

16. The optical chiral circular fiber polarizer of claim 9, wherein said twist profile is configured to achieve a reduced extinction ratio.

* * * * *